United States Patent
Rácz

(10) Patent No.: US 8,971,848 B2
(45) Date of Patent: Mar. 3, 2015

(54) SYSTEM AND METHOD FOR MANAGING UE-BASED NETWORK PERFORMANCE MEASUREMENTS

(75) Inventor: András Rácz, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 193 days.

(21) Appl. No.: 13/167,309

(22) Filed: Jun. 23, 2011

(65) Prior Publication Data

US 2011/0319115 A1    Dec. 29, 2011

Related U.S. Application Data

(60) Provisional application No. 61/358,095, filed on Jun. 24, 2010, provisional application No. 61/392,548, filed on Oct. 13, 2010.

(51) Int. Cl.
| | |
|---|---|
| *H04M 1/66* | (2006.01) |
| *H04W 24/10* | (2009.01) |
| *H04W 24/08* | (2009.01) |

(Continued)

(52) U.S. Cl.
CPC .............. *H04W 24/10* (2013.01); *H04W 24/08* (2013.01); *H04W 28/18* (2013.01); *H04W 36/00* (2013.01)
USPC ........ 455/411; 455/514; 455/67.11; 455/509; 455/72; 455/70; 455/68; 455/39; 455/434; 455/436; 370/476; 370/329; 370/310; 370/328; 370/464; 370/496; 370/480; 370/330; 370/432; 370/225

(58) Field of Classification Search
USPC .............. 455/514, 67.11, 509, 72, 70, 68, 39, 455/434, 450, 436, 418, 410, 435.1, 4, 44, 455/422.1, 522, 411; 370/476, 329, 310, 370/328, 282, 464, 496, 480, 330, 331, 432, 370/354, 225, 228
See application file for complete search history.

(56) References Cited

U.S. PATENT DOCUMENTS

| | | | |
|---|---|---|---|
| 2008/0192770 A1* | 8/2008 | Burrows et al. | 370/466 |
| 2009/0046655 A1* | 2/2009 | Zhao et al. | 370/331 |

(Continued)

OTHER PUBLICATIONS

3GPP "Technical Specification Group Services and System Aspects; Telecommunication management: Subscriber and equipment trace; Trace control and configuration management" (Release 10). V10.0.0. Jun. 16, 2010, pp. 1-82, XP050441838.

(Continued)

*Primary Examiner* — Ganiyu A Hanidu

(57) ABSTRACT

A method and apparatus for managing UE-based network performance measurements utilizing a process of tracing a UE in a radio telecommunication network. An eNB may receive a trace activation message from a Mobility Management Entity, MME, or a Network Management Entity, wherein the trace activation message includes eNB-specific, and optionally MME-specific, selection conditions for selecting a UE for a trace session. The eNB selects a UE for tracing when the eNB-specific selection conditions are satisfied, and may send the MME-specific selection conditions to the MME for evaluation. When all selection conditions are satisfied, the eNB activates the trace session with the selected UE. The Trace Activation IE utilized in the Trace Start message, the UE Context Setup Request message, and the Handover Request message is extended with additional IEs in order to implement the method.

6 Claims, 5 Drawing Sheets

(51) Int. Cl.
*H04W 28/18* (2009.01)
*H04W 36/00* (2009.01)

(56) References Cited

U.S. PATENT DOCUMENTS

| | | | | |
|---|---|---|---|---|
| 2009/0137265 | A1* | 5/2009 | Flore et al. | 455/525 |
| 2009/0257353 | A1* | 10/2009 | Song et al. | 370/241 |
| 2010/0085927 | A1* | 4/2010 | Torsner et al. | 370/329 |
| 2010/0272263 | A1* | 10/2010 | Yao et al. | 380/270 |
| 2010/0303041 | A1* | 12/2010 | Diachina et al. | 370/331 |
| 2011/0171979 | A1* | 7/2011 | Rune | 455/458 |
| 2011/0201279 | A1* | 8/2011 | Suzuki et al. | 455/67.11 |

OTHER PUBLICATIONS

Huawei, at al, Usage of 3GPP Signalling-Based Trace Capabilities for MDT. S5-1008800. Feb. 27, 2010.

Qualcomm CDMA Technologies. Requirements for Management of UE Based Performance Measurements for MDT. S5-101379. May 2, 2010.

Nokia Siemens Networks, Using Cell Trace for MDT. S5-100457 Jan. 22, 2010.

Nokia Siemens Networks. UE Selection Related to Minimisation of Drive Test. S5-101255. May 2, 2010.

3GPP TS 32.421 V9.1.0; 3rd Generation Partnership Project; Technical Specification Group Services and System Aspects; Telecommunication management; Subscriber and equipment trace: Trace concepts and requirements (Release 9); Mar. 2010.

3GPP TS 32.423 V8.3.0; 3rd Generation Partnership Project; Technical Specification Group Services and System Aspects; Telecommunication management; Subscriber and equipment trace: Trace data definition and management (Release 8); Mar. 2010.

* cited by examiner

US 8,971,848 B2

SYSTEM AND METHOD FOR MANAGING UE-BASED NETWORK PERFORMANCE MEASUREMENTS

RELATED APPLICATIONS

This application claims the benefit of U.S. Provisional Application No. 61/358,095 filed 24 Jun. 2010 and U.S. Provisional Application No. 61/392,548 filed 13 Oct. 2010.

TECHNICAL FIELD

The present invention relates generally to radio telecommunication networks, and in particular, to a system and method for managing User Equipment (UE)-based network performance measurements utilizing a process of tracing a UE in the network.

BACKGROUND

Existing Third Generation Partnership Project (3GPP) systems, including 2G/3G systems and the newly emerging SAE/LTE system, support the possibility to trace a particular user throughout its lifetime in the network. The users may be selected for tracing based on user identity (International Mobile Subscriber Identity (IMSI)-based trace), terminal identity (International Mobile Equipment Identity (IMEI)-based trace), or location (cell trace). During tracing, all network activities related to the particular user can be logged and later delivered to a central management entity for evaluation. Logged network activities include signaling messages sent/received either on the radio interface or network node interfaces. Additional details of trace functionality in 3GPP systems may be obtained from 3GPP TS 32.421, "Subscriber and equipment trace: Trace concepts and requirements"; 3GPP TS 32.422, "Subscriber and equipment trace: Trace control and configuration management"; and 3GPP TS 32.423, "Subscriber and equipment trace: Trace data definition and management".

Typically, tracing is utilized to troubleshoot problematic user connections (for example, in response to user complaints) or to monitor generic network performance and to perform root cause analysis to identify network problems.

More recently, 3GPP has started to work with the concept of UE-based network performance measurements (also called Minimization of Drive Test (MDT) measurements), where the objective is to utilize the measurements performed by the terminals for network performance monitoring and optimization purposes. There are MDT measurements defined both for UE connected state and idle state. The connected mode measurements are also called immediate MDT measurements, referring to the fact that the UE reports the measurements as they are performed via the legacy Radio Resource Control (RRC) protocol mechanisms, i.e., no internal logging in the UE. The idle mode MDT measurements are also called logged MDT, because the UE collects and logs the measurements and then reports them to the network in a batch. Note that logged reporting in idle mode is necessary because the UE does not have an active connection to the network in idle mode and thereby it cannot report the measurements at the time they are taken.

SUMMARY

For the management of MDT measurements, 3GPP has selected to use the trace concept, which will provide the capability for the network management system to configure and collect such measurements by using the trace methods. 3GPP has also defined a number of requirements on selection options that shall be defined in the standard and shall be available for the network operator to specify which UEs shall take part in a measurement campaign (for example, selected based on IMSI/IMEI, cell, device capabilities and/or combinations of these). The selection requirements are defined in S5-101506, "Output of discussions on requirements for management of UE based network performance measurements", SA5#71, tp://ftp.3gpp.org/tsg_sa/WG5_TM/TSGS5_71/Docs/.

However, the details of how to implement the trace method for management of UE performance measurement purposes are still open and the necessary extensions to existing trace methods have not yet been identified.

According to the trace concept, the trace target and the trace configuration are specified by the network management entity, which sends the configuration to the involved network nodes. In the trace configuration, the network management entity may specify the interface(s) for collecting trace logs as well as the level of trace information details (for example, all message elements logged or only most relevant ones, etc.).

Current 3GPP systems activate tracing through either "signaling-based activation" or "management-based activation". In signaling-based activation, the trigger for tracing a particular user is propagated piggy-backed on the regular UE-specific signaling messages sent between the network nodes through which the given user flow passes. Initially the management system configures the particular user for tracing in the Home Subscriber System (HSS) or in core network nodes such as the Mobility Management Entity (MME) or Serving GPRS Service Node (SGSN) based on the user IMSI or IMEI. As soon as the user with the given IMSI or IMEI appears in the system and the HSS is interrogated for user information (for example, security credentials at user attach), the trace trigger is propagated to related network nodes via the invoked signaling flow.

In management-based activation, the trace trigger is not propagated to other nodes. The management system configures selected network nodes to trace a particular user or set of users. When a new user appears at the given network node, it evaluates the selection criteria and starts trace recording if the condition is satisfied.

At present, however, 3GPP standards lack support to realize all the UE selection options as specified in the 3GPP requirements and to fulfill the needs of potential future use cases. More specifically, the 3GPP defined use cases require that multiple network nodes (both MME and eNB) take part in the UE selection decision and that the selection can be initiated from the eNB. Currently undefined extensions are needed in the signaling procedures and node behaviors in order to realize the specified use cases.

The present invention introduces the necessary signaling procedures, including new messages and information elements and extended trace control and configuration parameters for handling flexible UE selection conditions where both the MME and the eNB take part in UE selection and the trace initiation can originate from the eNB.

In one embodiment, the present invention is directed to a method of managing UE-based network performance measurements utilizing a process of tracing a UE in a radio telecommunication network. The method includes the steps of receiving at an eNB, a trace activation message from an MME, wherein the trace activation message includes eNB-specific selection conditions for selecting a UE for a trace session; evaluating by the eNB, the eNB-specific selection conditions; and initiating the trace session by the eNB toward a selected UE when the eNB-specific selection conditions are satisfied.

In another embodiment, the present invention is directed to a method of managing UE-based network performance measurements utilizing a process of tracing a UE in a radio telecommunication network, wherein the method includes the steps of receiving at an eNB, trace control and configuration parameters from a network management entity, wherein the parameters include both eNB-specific selection conditions and MME-specific selection conditions; and pre-selecting by the eNB, UEs for tracing based on the eNB-specific selection conditions. The method also includes sending a trace request message from the eNB to the MME notifying the MME that a given one of the UEs has been pre-selected by the eNB for tracing, the trace request message including the MME-specific selection conditions; ° evaluating by the MME, the MME-specific selection conditions; sending a trace start message from the MME to the eNB when the MME-specific selection conditions are satisfied; and initiating the trace by the eNB toward the given UE.

In another embodiment, the present invention is directed to a method of managing UE-based network performance measurements utilizing a process of tracing a UE in a radio telecommunication network, wherein the method includes the steps of receiving at an eNB, trace control and configuration parameters from a network management entity, wherein the parameters include only eNB-specific selection conditions; selecting by the eNB, UEs for tracing based on the eNB-specific selection conditions; and initiating a trace by the eNB toward a given one of the selected UEs.

In another embodiment, the present invention is directed to an apparatus in an eNB, for managing UE-based network performance measurements utilizing a process of tracing a UE in a radio telecommunication network. The apparatus includes an input mechanism configured to receive a trace activation message from an MME, or a Network Management Entity, wherein the trace activation message includes eNB-specific selection conditions for selecting a UE for a trace session; a processing unit having an evaluation unit configured to evaluate the eNB-specific selection conditions, and a UE selection unit configured to select a UE based on a result from the evaluation unit; and an output mechanism for initiating the trace session toward the selected UE when the eNB-specific selection conditions are satisfied.

In another embodiment, the present invention is directed to an apparatus in an MME for managing UE-based network performance measurements utilizing a process of tracing a UE in a radio telecommunication network. The apparatus includes an input mechanism configured to receive a trace activation message from a Network Management Entity, wherein the trace activation message includes both MME-specific selection conditions and eNB-specific selection conditions for selecting a UE for a trace session; a processing unit having an evaluation unit configured to evaluate the MME-specific selection conditions, and a UE selection unit configured to select a UE based on a result from the evaluation unit; and an output mechanism for sending a trace start command to a source eNB, wherein the trace start command includes an identity of a selected UE and the eNB-specific selection conditions.

The extensions of the UE/subscriber trace and the cell traffic trace methods described herein make it possible to realize the trace configuration and UE selection requirements as set by 3GPP for the management of UE-based network performance measurements and to prepare for future use cases requiring more flexible selection conditions. The procedures and messages described below for the different use cases ensure that the number of signaling messages is kept at a minimum, while the flexibility of the configuration is ensured.

DETAILED DESCRIPTION

Three alternative embodiments are described below for using the trace mechanism for the management of UE-based network performance measurements. The embodiment selected for use depends on the particular use case, i.e., the particular UE selection option being utilized.

The three embodiments differ in terms of whether the trace is initiated from the Evolved Packet Core (EPC) or the Evolved UMTS Radio Access Network (E-UTRAN).

In the first embodiment, the trace is always initiated from the EPC (MME or HSS), the trace parameters are configured in the EPC (MME or HSS), and the trace targets a specific subscriber or UE or a specific set of subscribers/UEs, which is the reason why the EPC is involved in the selection. Since the trace is for a specific subscriber or UE (or a specific set of subscribers/UEs), the trace configuration is tied to the specific UE context, i.e., the trace configuration for UE selection criteria needs to be carried with the UE as it moves.

In the second and third embodiments, the trace is initiated from the E-UTRAN. The particular embodiment depends on whether or not the MME is involved in the UE selection, i.e., whether or not the trace is specific for a given subscriber/UE (or specific set of subscribers/UEs). In the second embodiment, the MME is involved in the UE selection, the trace selection condition is tied to one specific UE context, and the trace configuration needs to be moved with the UE at mobility. In the third embodiment, only the eNB is involved in UE selection. In this case, the selection condition can be tied to the eNB and may not need to be moved with the UE at mobility.

Activation from EPC

Figure 1:
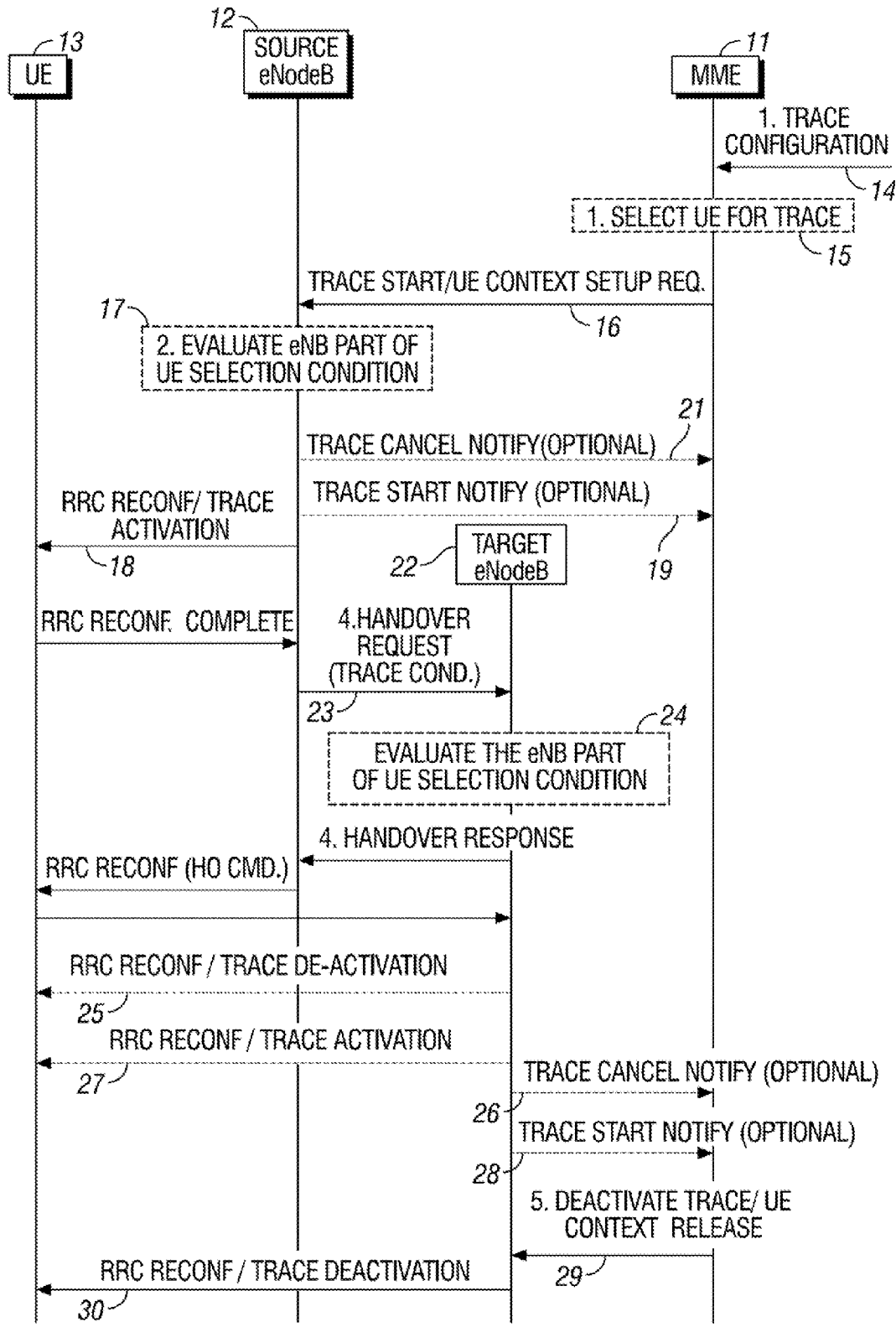
FIG. 1 is a signaling diagram illustrating the steps for initiating a trace from the EPC with eNB-involved UE selection in an exemplary embodiment of the method of the present invention.

FIG. 1 is a signaling diagram illustrating an exemplary embodiment of a method of initiating a trace from the EPC (for example, from the MME) 11 with a source eNB 12 being involved in the selection of a UE 13. In use cases where the trace activation is originating from the MME, the trace control and configuration parameters are configured at the MME (from the management system). The trace configuration parameters for UE selection include MME-specific parts (for example, IMSI, IMEI-based) and in addition may include eNB-specific parts as well. The trace configuration is tied to the specific UE context and it is moved with the UE at mobility.

The trace is initiated from the MME 11 according to the following procedure.

1. At step 14, the management system configures the MME 11 (or HSS) with trace control and configuration parameters. At step 15, the MME makes a selection of UEs based on MME-specific selection conditions (IMSI, IMEI) and at step 16 sends trace activation signaling to the source eNB 12 where the UE 13 is currently being served. The MME includes the eNB-specific selection conditions in the activation message (Trace Start or Initial UE Context message).

The MME also initiates activation of an MDT trace session (immediate MDT) for a particular UE at UE context setup at the eNB, when the UE context in the MME includes a stored immediate MDT trace configuration, which has been previously established. This is the case when an immediate MDT trace session has been previously activated for the UE, and the UE later entered idle state during which the MME preserved the MDT trace configuration.

If the MDT trace session stored in the MME is of the logged MDT type, the MME downloads the logged MDT trace session parameters to the eNB at UE context setup, but the trace session does not need to be activated again (as it is already ongoing in the UE). For this purpose, a new IE called "ongoing logged MDT trace" is introduced in the "Initial Context Setup" (also called UE Context Setup) message. Upon receiving the configuration of an ongoing logged MDT trace session for the UE at the source eNB, the eNB stores the received trace session information in order to avoid overwriting of an existing configuration at the UE.

The MME preserves a newly activated MDT trace session context, either logged MDT or immediate MDT, and stores the context as part of the UE context until the trace session is terminated.

For activation signaling, UE-specific S1 signaling may be used, either the Trace Start message or the Initial Context Setup Request message may be used as in the legacy case. In the present invention, however, these messages are extended with eNB-specific selection parameters, as described in more detail below.

It should be noted that the MME may evaluate some parts of the eNB-specific selection criteria on its own, if the MME has the necessary information, and the MME may activate the trace only for those pre-selected UE connections. For example, when the MME knows at which eNB the UE is located, the MME may not initiate the trace if the cell-specific UE selection condition does not include any of the cells from the particular eNB.

2. Upon receiving the trace activation signaling from the MME 11, the eNB 12 evaluates the E-UTRAN-specific part of the UE selection condition at step 17 and initiates the trace toward the UE at step 18 when the condition is satisfied. Optionally, the source eNB may indicate to the MME at step 19 that the UE selection has been successful (optional message). For this purpose, either a new message type (Trace Start Notify) can be used, or the information may be piggybacked on the S1 Context Setup Response message.

If the eNB-specific conditions are not satisfied, the source eNB 12 may inform the MME 11 about the unsuccessful UE selection at step 21. For this purpose, a new message type may be introduced (named for example, Trace Cancel Notify). In response to the eNB indication, the MME may decide to deactivate the trace for the particular UE by sending a Deactivate Trace message (not shown).

3. Unless the trace is deactivated from the MME 11, the source eNB 12 keeps the trace configuration and passes the UE-specific trace context to a target eNB 22 in case of UE mobility.

4. At UE mobility, the target eNB 22 receives the trace configuration at step 23, and at step 24 re-evaluates the eNB-specific part of the UE selection condition, received in the passed trace context. If the trace was already active in the source cell, and the conditions are still satisfied in the target cell, the trace is continued and no signaling needs to take place. If the trace was active in the source cell but the conditions are no longer satisfied in the target cell, the target eNB sends an RRC reconfiguration message 25 to the UE 13 deactivating the measurement reporting of the UE 13 and may inform the MME 11 about the unsuccessful UE selection in a Trace Cancel Notify message 26 (introduced above). In response to the indication, the MME may decide to deactivate the trace for the particular UE.

If the trace was not activated in the source cell but the eNB-specific conditions are satisfied in the target cell, the target eNB 22 initiates the trace toward the UE 13 in an RRC reconfiguration message 27 and may inform the MME 11 about the successful UE selection either in the handover signaling message (Path Switch Request or Handover Notify) or in a separate Trace Start Notify message 28. If the trace was not activated in the source cell, and the eNB conditions are not satisfied in the target cell either, the target eNB does not need to do anything; the trace will remain inactivated at the UE.

In order to inform the target eNB 22 whether or not the tracing was active in the source cell, a separate information element may be used in the handover signaling messages to forward the trace context. This is described in more detail below. The existence of an ongoing trace recording session may be visible for the target eNB based on a valid trace recording session identifier filled-in within the Handover Request message.

5. Since the trace was initiated from the MME 11, it is the responsibility of the MME to deactivate the trace when it is no longer needed. The MME may deactivate the trace at any point in time by sending the Deactivate Trace message 29 to the serving eNB (source or target), which forwards the trace deactivation to the UE 13 at step 30.

It should be noted that the MDT trace configuration procedure shown in FIG. 1 applies for both the immediate MDT (i.e., idle mode MDT measurements) and logged MDT modes (i.e., connected mode MDT measurements). The only difference is that in the logged MDT case, the handover procedure does not apply when the UE is in idle mode and has no connectivity to the network. However, when the UE is in connected mode and has a logged MDT trace session configured, the logged MDT trace parameters are passed on to the next eNB at handover. The next eNB may evaluate the UE selection conditions for capability, but the area selection conditions are evaluated by the UE for logged MDT.

For activation/deactivation of immediate MDT measurements (trace) at the UE, RRC signaling messages may be used.

Activation from E-UTRAN with MME Involved

Figure 2:
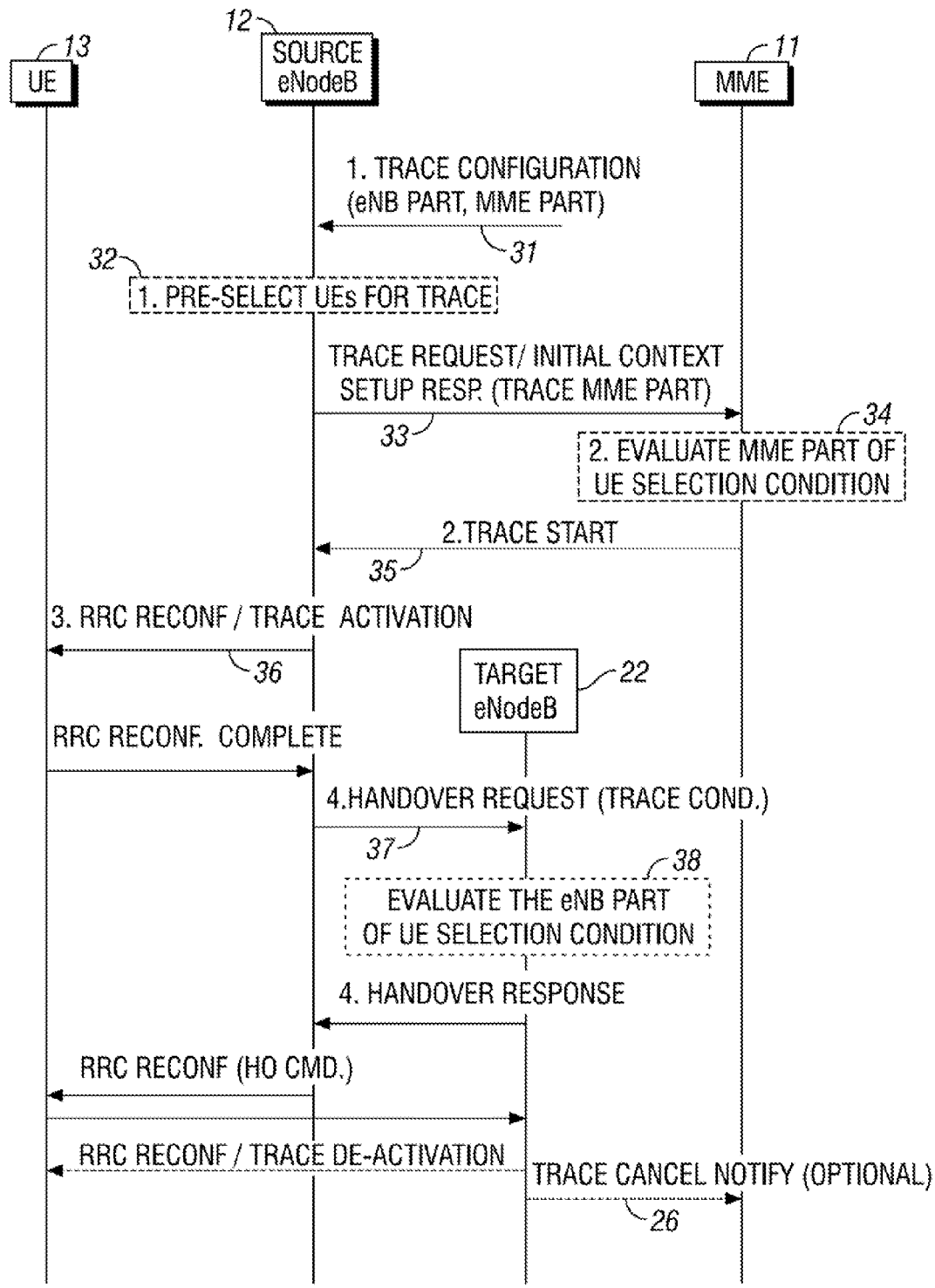
FIG. 2 is a signaling diagram illustrating the steps for initiating a trace from the E-UTRAN with MME-involved UE selection in an exemplary embodiment of the method of the present invention.

FIG. 2 is a signaling diagram illustrating an exemplary embodiment of a method of initiating a trace from the E-UTRAN with MME-involved UE selection. In this case the trace control and configuration parameters are configured at the eNB (performed from the management system), where the trace parameters for UE selection may include both eNB-specific (for example, cell or device capabilities) and MME-specific parts (for example, IMEI Type Approval Code (TAC)). The trace configuration is tied to the specific UE contexts and moved with the UE at mobility. The trace is initiated from the eNB with the involvement of the MME according to the following procedure.

1. At step 31, the management system initially configures the source eNB 12 with trace control and configuration parameters. At step 32, the source eNB pre-selects UEs for network performance measurements based on the eNB-specific selection criteria as given by the trace configuration parameters. For a given one of the pre-selected UEs, the eNB sends an indication to the MME 11 at step 33; notifying the MME that the given UE has been pre-selected by the eNB for tracing and includes the MME-specific part of UE selection criteria in the message. For this purpose, a new message type may be introduced (named for example, Trace Request) or the necessary information elements may be added to existing S1 messages (for example, to the handover signaling messages, Path Switch Request, Handover Notify, or the UE Context Setup Response message).

At the same time, the message may also serve as a trigger to start tracing the UE in EPC network elements, for which case the message may include EPC-specific trace trigger conditions and trace configuration parameters. The eNB does not initiate tracing toward the UE until a response is received from the MME.

2. At step 34, the MME 11 receiving the request from the eNB 12 evaluates the MME-specific part of the UE selection criteria (for example, selection based in IMEI TAC) and at step 35 sends a trace trigger in a response message to the eNB, when the selection criteria is satisfied. For this purpose, the Trace Start message (or other S1 signaling messages already carrying trace information) potentially extended with new information elements may be used or a new message type may be introduced specifically for this purpose.

3. After receiving the trace trigger from the MME 11, the eNB 12 initiates the trace at step 36 toward the UE 13. The eNB is able to correlate the received Trace Start message with the previously sent Trace Request in order to confirm that it is the expected response message and to identify the correct trace context. The E-UTRAN Trace ID information element in the message may be used for that purpose. The eNB receiving the response message matches the carried Trace ID with the trace ID sent in a previous Trace Request message in order to relate the request and response messages to each other. Since the eNB originally initiated the trace, the responsibility for controlling the trace remains at the eNB, i.e., it is different from the case of EPC-originated trace described in FIG. 1.

4. In case of UE mobility, the source eNB 12 passes the trace context of the UE at step 37 to the target eNB 22, which at step 38 evaluates the eNB-specific UE selection conditions received in the passed trace context. If the trace conditions are still satisfied, the trace is continued; otherwise the target eNB deactivates the trace by sending a stop trigger to the UE and may inform the MME at the same time, either in the handover signaling messages or in a separate message (Trace Cancel Notify message 26 introduced above).

It should be noted that an alternative is to not forward the selection condition to the target eNB at mobility and rely on the selection condition pre-configured in the target eNB instead (i.e., the trace configuration may be tied to the node instead of the UE context). Such a solution would be similar to the third embodiment described below, except that the MME would be involved in the selection. This would, however, also mean that each eNB (after a handover) may need to determine whether the MME-specific selection conditions of the target cell are still satisfied. Therefore, the target eNB may need to invoke the Trace Request procedure after each cell change. (The Trace Request may be piggy-backed on the handover signaling message as well, i.e., on the Path Switch Request or on the Handover Notify messages). As such extra signaling at each handover is less efficient, this alternative embodiment is not preferred. The same procedure applies for the configuration of both immediate MDT and logged MDT measurements.

Activation from E-UTRAN with MME not Involved

Figure 3:
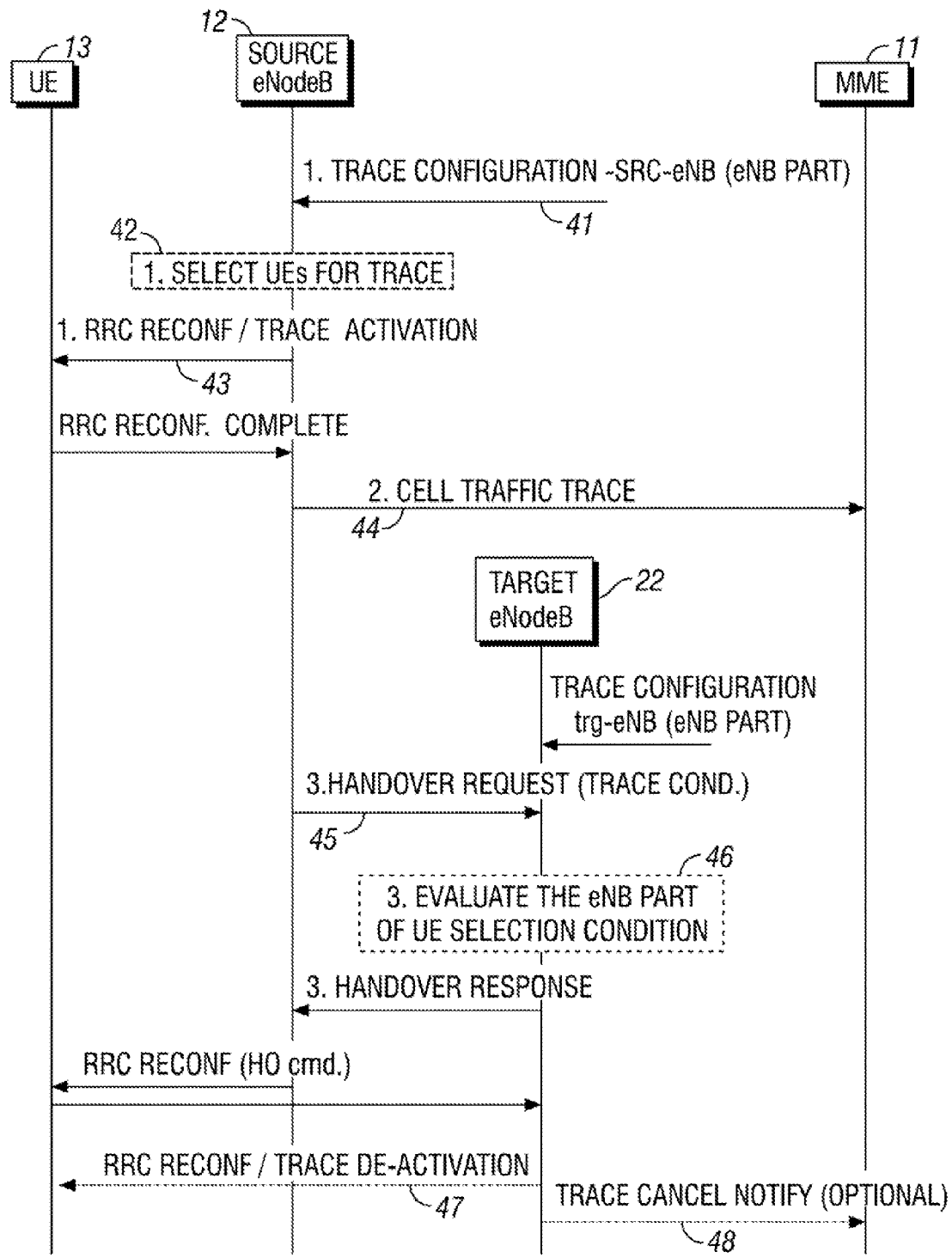
FIG. 3 is a signaling diagram illustrating the steps for initiating a trace from the E-UTRAN when the MME is not involved with UE selection in an exemplary embodiment of the method of the present invention.

FIG. 3 is a signaling diagram illustrating an exemplary embodiment of a method of initiating a trace from the E-UTRAN when the MME 11 is not involved with UE selection. In this case, at step 41, the management system configures the trace control and configuration parameters at the source eNB 12. The trace parameters for UE selection include only eNB-specific parts (for example, cell id or device capabilities). In this case, the trace configuration is tied to the specific network element, i.e., to the source eNB and not to the particular UE context. This means that the UE selection criteria are not moved with the UE at mobility, since the criteria are specific to the source eNB. The UE trace trigger together with the trace identities can, however, be moved. When the UE changes eNB, the target eNB 22 evaluates whether its own selection conditions are satisfied for the incoming UE and decides accordingly whether tracing is continued or deactivated. Since the management system configures the trace control and configuration parameters at the source eNB, and the trace parameters for UE selection include only eNB-specific parts, the MME is not involved in the selection process.

1. After the management system configures the source eNB 12 with trace control and configuration parameters, the source eNB determines whether the selection conditions are satisfied for one or more UEs and selects UEs for trace at step 42. At step 43, the eNB triggers tracing toward the selected UEs.

2. At the same time, the source eNB 12 notifies the MME 11 at step 44 that a trace has been started for the given UE by sending the Cell Traffic Trace S1 message (legacy procedure). This message triggers the MME to signal the mapping, between trace session ID and IMSI to the trace collection entity (TCE) (not shown). For logged MDT, the MME may store the received configuration parameters of the trace recording session started by the eNB for the given UE context. For this purpose, the Cell Traffic Trace message may be extended with new IEs. The MME downloads the stored logged MDT configuration to the eNB in the S1 Initial Context Setup message every time the UE context is re-established at the eNB. For this purpose, a new IE referred to herein as "ongoing logged MDT trace" is introduced in the "Initial Context Setup" message.

Upon receiving the configuration of an ongoing logged MDT trace session for the UE at the source eNB 12, the eNB stores the received trace session information in order to avoid overwriting of an existing configuration at the UE.

3. At UE mobility, the trace trigger may be passed to the target eNB 22 at step 45 in order to ensure the continuous tracing of the same UE across cell borders. As noted above, however, the UE selection conditions do not need to be transferred to the target eNB because each eNB has its own selection condition configured, which is used to evaluate whether the UE is eligible for trace in the new cell at step 46. As noted below, the UE may need to know whether or not the trace context is transferred in the network and whether the UE has to keep or discard the trace configuration.

4. If the UE has not been selected for trace in the new cell, the target eNB 22 sends a stop trigger to the UE at step 47 and may also notify the MME about the deactivation of trace at step 48.

UE Behavior

In case of a handover, the UE 13 may need to act differently regarding the trace, depending on whether or not the UE-specific trace context (including at least trace session ID and configured measurements) is transferred in the network. When the trace context is transferred, the UE keeps the trace configuration in the new cell and continues the reporting. Otherwise, the UE discards the trace configuration, either implicitly or in response to an explicit request from the network.

When the trace context transfer is optional in the network (for example, not supported in the cell traffic trace based management) and a trace is activated at the UE, the UE needs to be notified whether or not context transfer is supported in the network. The indication can be sent in an RRC message (for example, the RRC Connection Reconfiguration message) that is used to activate the trace at the UE and to configure the required performance measurements. For this purpose, a new information element (named for example, "context transfer support") may be added to the corresponding RRC message. Depending on whether or not the MDT measurement configuration is kept or deleted in the signaled RRC Connection Reconfiguration message, the message can also be used as an implicit indicator for the UE to determine whether to continue MDT trace in the target cell.

At a handover, when the availability of trace context transfer has been indicated to the UE in the trace activation message, the UE keeps the trace configuration (i.e., trace session ID, measurement configuration) at handover and continues the measurement reporting in the target cell. Note, however, that according to the legacy procedure, the target eNB may reconfigure some of the RRC measurements either in the handover command or in a separate RRC message sent in the target cell.

When the trace activation message to the UE indicates the unavailability of trace context transfer, the UE discards the trace context in the target cell, including the trace session ID and the corresponding measurement configuration. Note that the UE may send a last measurement report in the target cell including the measurements collected during and immediately after the handover as requested by the previous measurement configuration in the source cell.

This procedure may be further optimized by having the UE continue to collect the measurements in the target cell according to the source configuration until a predetermined time or until a new trace activation is started from the target cell. This extension would ensure that no interruptions occur in the measurements at handovers when trace is stopped by the source cell and then restarted by the target cell.

Figure 4:
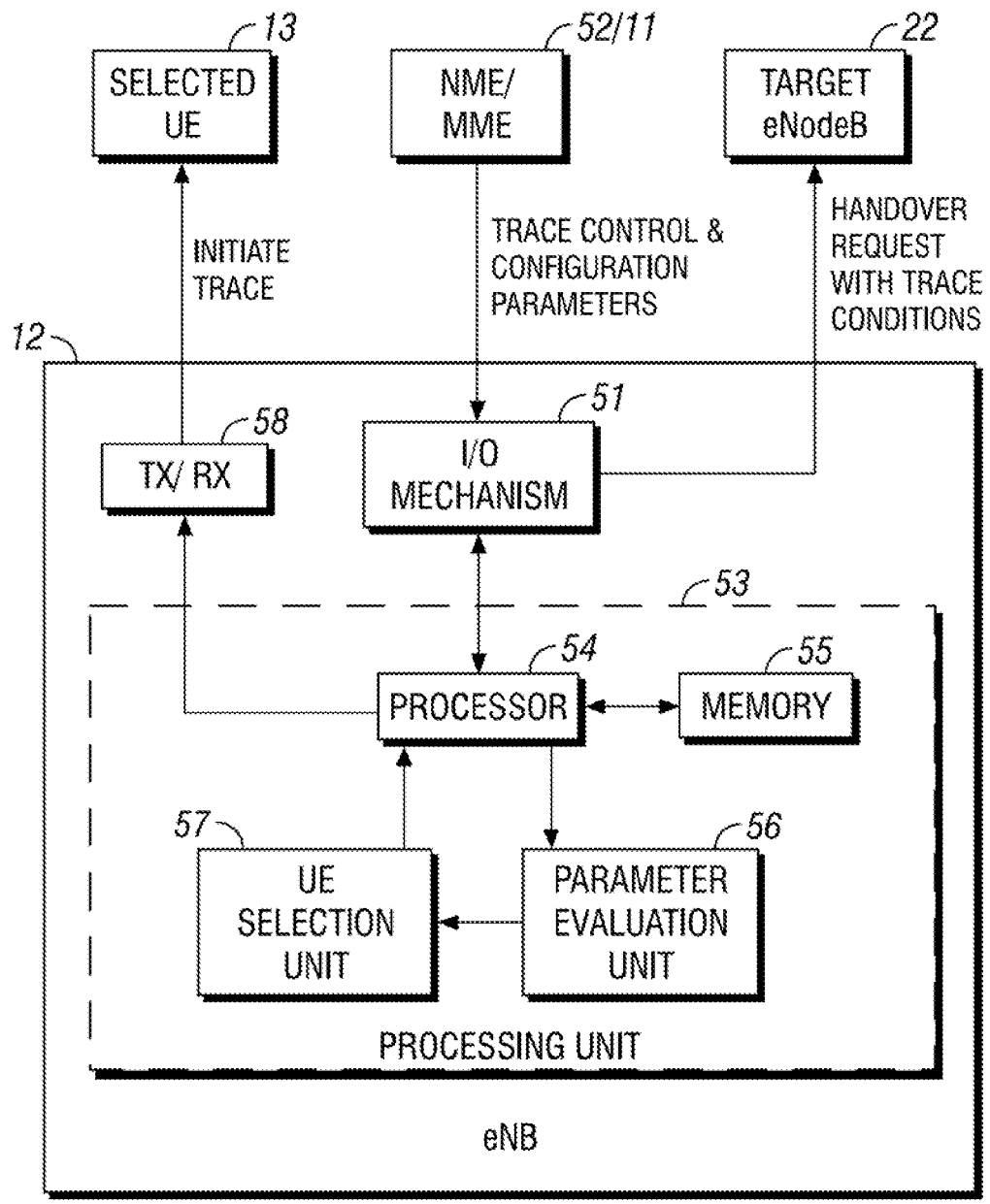
FIG. 4 is a simplified block diagram of an exemplary embodiment of an apparatus in an eNB configured to perform the method of the present invention.

FIG. 4 is a simplified block diagram of an exemplary embodiment of an apparatus in the eNB 12 configured to perform the method of the present invention. An input/output (I/O) mechanism 51 receives trace control and configuration parameters from either a Network Management Entity (NME) 52 or the MME 11. The I/O mechanism forwards the parameters to a processing unit 53, which includes a processor 54, a memory 55 for storing computer program instructions for the processor, a parameter evaluation unit 56 for evaluating the trace control and configuration parameters, and a UE selection unit 57 for selecting (or pre-selecting) a UE for a trace session. When a UE is selected, the processor controls a transceiver (TX/RX) 58 to command the selected UE 13 to initiate the trace session. In the case of a handover to the target eNB 22, the processor causes the I/O mechanism to send a handover request to the target eNB and to include in the request, trace conditions including eNB-specific selection conditions.

Figure 5:
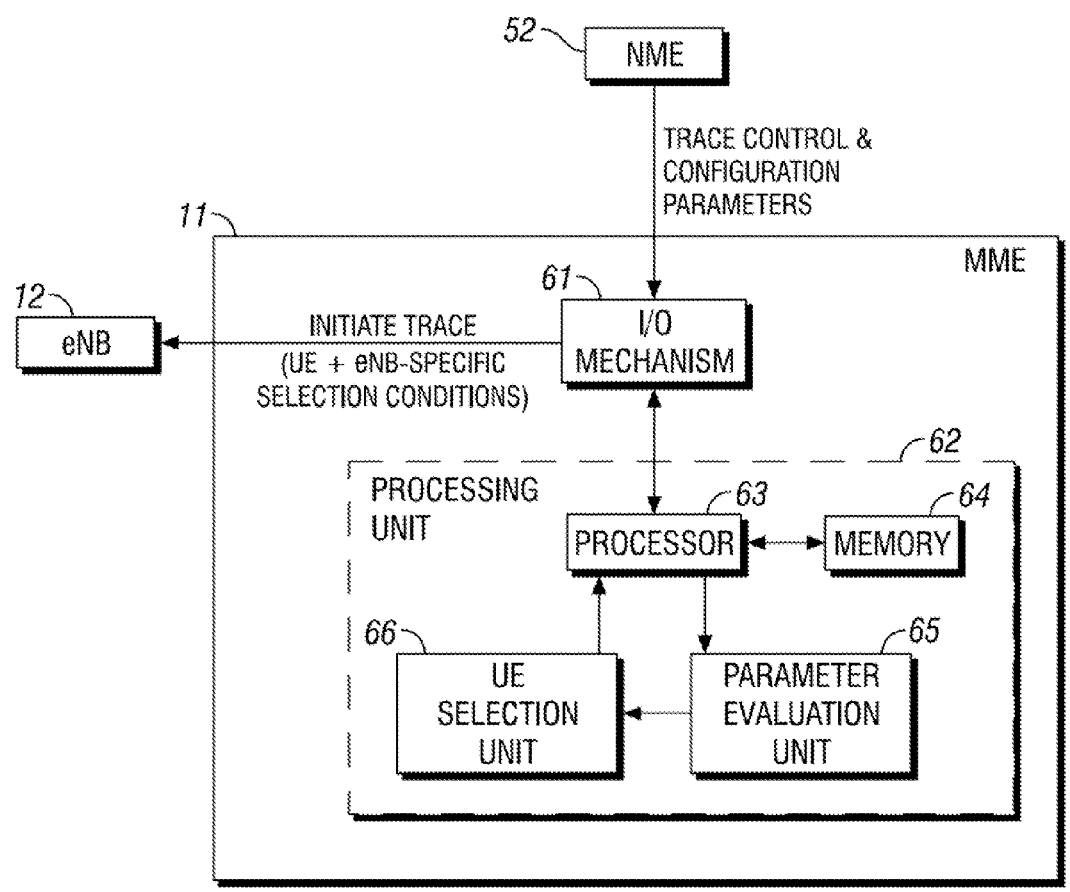
FIG. 5 is a simplified block diagram of an exemplary embodiment of an apparatus in an MME configured to perform the method of the present invention.

FIG. 5 is a simplified block diagram of an exemplary embodiment of an apparatus in the MME 11 configured to perform the method of the present invention. An input/output (I/O) mechanism 61 receives trace control and configuration parameters from the NME 52. The I/O mechanism forwards the parameters to a processing unit 62, which includes a processor 63, a memory 64 for storing computer program instructions for the processor, a parameter evaluation unit 65 for evaluating the trace control and configuration parameters, and a UE selection unit 66 for selecting (or pre-selecting) a UE for a trace session. When a UE is selected, the processor controls the I/O mechanism to command the source eNB 12 to initiate the trace session with the selected UE. The command (Trace Activation or UE Context Setup Request) includes an identity of the selected UE and eNB-specific selection conditions.

Deactivation Mechanisms for MDT Trace Sessions

1. E-UTRAN deactivation mechanisms for UE-based network performance measurements (management based). When the eNB receives a message from an Element Manager (EM) (i.e., from the management system) to deactivate an MDT trace session, the eNB deactivates the trace session for those E-UTRAN cells that are indicated in the message. For an immediate MDT trace session, the eNB deactivates the corresponding MDT RRC measurements in the UEs that have been configured for immediate MDT trace as part of the given trace session.

2. Deactivation mechanisms at the UE for UE-based network performance measurements (management based). The UE silently discards a logged MDT trace session when the logging duration expires.

3. EPC deactivation mechanisms for UE-based network performance measurements (signaling based). When an HSS receives a Trace Session Deactivation from the Management System, the HSS sends an S6a-Delete Subscriber Data Request message to the MME at which the UE is currently registered. For an immediate MDT trace session, when the UE is in connected mode, the MME sends the trace session deactivation toward the eNB. The eNB deactivates the corresponding MDT RRC measurements in the UE and discards the given trace session context. For an immediate MDT trace session, when the UE is in idle mode, the MME silently discards the given trace session context.

For a logged MDT trace session, when the UE is in connected mode, the MME sends the trace session deactivation toward the eNB. The eNB deactivates the corresponding logged MDT measurements in the UE and discards the given trace session context.

For a logged MDT trace session, when the UE is in idle mode, the MME marks the corresponding trace session as inactive and initiates the deactivation of the trace session toward the eNB the next time the UE enters connected state, or discards the trace session when the duration of the trace session expires, whichever occurs first.

4. Deactivation mechanisms at the UE for UE-based network performance measurements (signaling based). The UE discards a logged MDT trace session either when the UE receives a deactivation signal from the eNB or when the logging duration expires.

Starting/Stopping MDT Trace Recording Sessions

1. E-UTRAN starting mechanisms for UE-based network performance measurements (management based). A trace recording session is started in the eNB for each selected UE that satisfies the MDT UE selection criteria, provided that a trace session has been previously activated in the eNB from the EM for the given cell(s). The eNB configures the corresponding MDT RRC measurements at the selected UEs.

2. Starting mechanisms at the UE for UE-based network performance measurements (management based). There is no starting mechanism at the UE for MDT trace recording sessions. The UE executes the received MDT measurement configuration. For logged MDT, the UE stores the received trace recording session parameters as received from the eNB.

3. EPC starting mechanisms for UE-based network performance measurements (signaling based). In the MME, no trace recording sessions are started for MDT trace sessions. The MME sends the trace session activation to the eNB as described above and the eNB makes decisions about starting trace recording sessions.

4. E-UTRAN starting mechanisms for UE based network performance measurements (signaling based). A trace recording session is started in the eNB for a given UE when the MDT UE selection conditions are satisfied for the UE, no trace recording sessions of the same kind (i.e., immediate MDT or logged MDT) are ongoing for the UE, and a trace session has been previously activated for the UE. The eNB configures the corresponding MDT RRC measurements at the UE.

5. Starting mechanisms at the UE for UE-based network performance measurements (signaling based). There is no starting mechanism at the UE for MDT trace recording sessions. The UE executes the received MDT measurement configuration. For logged MDT, the UE stores the received trace recording session parameters as received from the eNB.

6. E-UTRAN stopping mechanisms for UE-based network performance measurements (management based). For immediate MDT, the eNB stops a trace recording session for a given UE when the UE changes cell or a trace session deactivation request is received from the eNB's EM. The eNB deactivates the corresponding MDT measurements in the UE.

7. Stopping mechanisms at the UE for UE-based network performance measurements (management based). For logged MDT, the UE stops an ongoing trace recording session when the logging duration expires. The UE indicates the availability of logged measurement results to the network the next time the UE enters connected mode.

8. EPC stopping mechanisms for UE-based network performance measurements (signaling based). There is no stopping mechanism in the EPC for MDT trace recording sessions, since there are no starting mechanisms either.

9. E-UTRAN stopping mechanisms for UE-based network performance measurements (signaling based). For immediate MDT, the eNB stops an ongoing trace recording session for a given UE when the MDT UE selection conditions are no longer satisfied or when a trace session deactivation is received from the MME. The eNB deactivate the corresponding MDT measurements in the UE. For logged MDT, the eNB stops an ongoing trace recording session for a given UE when a trace session deactivation is received from the MME.

10. Stopping mechanisms at UE for UE-based network performance measurements (signaling based). For logged MDT, the UE stops an ongoing trace recording session when logging duration expires or when deactivation is requested by the eNB. The UE indicates the availability of logged measurement results to the network next time the UE enters connected mode.

New Message Types and Information Elements

The "Trace Activation" information element (IE), which describes the trace parameters and configurations of the trace instance, is shown in Table 1 below. The Trace Activation IE is used in the Trace Start message, in the UE Context Setup Request message, and in the Handover Request message. The Trace Activation IE is extended in the present invention with the IEs indicated in bold in Table 1. It should be noted that the extension IEs may be structured and named differently in a particular embodiment, such that, the semantics and content of the IEs remain the same.

TABLE 1

| IE/Group Name | Presence | IE type and reference | Semantics description |
|---|---|---|---|
| E-UTRAN Trace ID | M | OCTET STRING (8) | The E-UTRAN Trace ID IE is composed of the following: Trace Reference defined in [10] (leftmost 6 octets), and Trace Recording Session Reference defined in [10] (last 2 octets) |
| Interfaces To Trace | M | BIT STRING (8) | Each position in the bitmap represents a eNB interface first bit = S1-MME, second bit = X2, third bit = Uu other bits reserved for future use. Value '1' indicates 'should be traced'. Value '0' indicates 'should not be trace'. |
| Trace depth | M | ENUMERATED (minimum, medium, maximum, MinimumWithoutVendorSpecificExtension, MediumWithoutVendorSpecificExtension, MaximumWithoutVendorSpecificExtension, . . . ) | Defined in [10] |
| UE selection eNB condition | O | (see 3.1.5.2) | It specifies the eNB specific UE selection conditions. |

TABLE 1-continued

| IE/Group Name | Presence | IE type and reference | Semantics description |
|---|---|---|---|
| UE select history | O | ENUMERATED (yes, no) | It indicates whether the UE was selected for tracing in the source cell. This IE element may be present only in the handover context transfer S1 and X2 messages. |
| Trace Collection Entity IP Address | M | Transport Layer Address 9.2.2.1 | Defined in [10] |
| Logged MDT measurement configuration | O | ENUMERATED ( . . . ) | It specifies the measurements to be taken by UE. Present only in case of a logged MDT trace session (in this case immediate MDT measurement config. parameter shall not be present) |
| Logging duration | O | INTEGER | Time duration of the trace session (present only in case of logged MDT trace session) |
| Immediate MDT measurement configuration | O | ENUMERATED ( . . . ) | It specifies the measurements to be taken by UE. Present only in case of a immediate MDT trace session (in this case logged MDT measurement config. parameter shall not be present) |

The "UE selection eNB condition" IE is shown in Table 2 below. This IE defines parameters for the eNB specific UE selection conditions.

TABLE 2

| IE/Group Name | Presence | Range | IE type and reference | Semantics description |
|---|---|---|---|---|
| Cell ID List | | 1 to <maxnoofCellID> | | |
| >E-CGI | M | | 9.2.1.38 | List of cells where UE shall be traced |
| UE Capability | O | | ENUMERATED ( . . . ) | |

The "Ongoing logged MDT trace" IE is shown in Table 3 below. This IE describes the trace parameters and configurations of a trace instant, and is introduced in the Initial Context Setup Request message. The Ongoing logged MDT trace IE is used to download the parameters of a logged MDT trace recording session that is ongoing at the UE. The use of the "UE selection eNB condition" IE may be omitted.

TABLE 3

| IE/Group Name | Presence | IE type and reference | Semantics description |
|---|---|---|---|
| E-UTRAN Trace ID | M | OCTET STRING (8) | The E-UTRAN Trace ID IE is composed of the following: Trace Reference defined in [10] (leftmost 6 octets), and Trace Recording Session Reference defined in [10] (last 2 octets) |

TABLE 3-continued

| IE/Group Name | Presence | IE type and reference | Semantics description |
|---|---|---|---|
| Start time | M | INTEGER | Starting time of the ongoing logged MDT trace recording session |
| Logging duration | M | INTEGER | Duration of the ongoing logged MDT trace recording session |
| Trace Collection Entity IP Address | M | Transport Layer Address 9.2.2.1 | Defined in [10] |
| UE selection eNB condition | O | (see 3.1.5.2) | It specifies the eNB specific UE selection conditions. |

The IEs of the Cell Traffic Trace message are shown in Table 4 below. The eNB sends this message to the MME to transfer specific information. The new IEs added to the message are indicated in bold in Table 4. These IEs need to be filled-in only when a logged MDT trace recording session is started by the eNB. The use of the "UE selection eNB condition" IE may be omitted.

TABLE 4

| IE/Group Name | Presence | IE type and reference | Semantics description | Criticality | Assigned Criticality |
|---|---|---|---|---|---|
| Message Type | M | 9.2.1.1 | | YES | ignore |
| MME UE S1 AP ID | M | 9.2.3.3 | | YES | reject |

TABLE 4-continued

| IE/Group Name | Presence | IE type and reference | Semantics description | Criticality | Assigned Criticality |
|---|---|---|---|---|---|
| eNB UE S1 AP ID | M | 9.2.3.4 | | YES | reject |
| E-UTRAN Trace ID | M | OCTET STRING (8) | The E-UTRAN Trace ID IE is composed of the following: Trace Reference defined in [10] (leftmost 6 octets), and Trace Recording Session Reference defined in [10] (last 2 octets) | YES | ignore |
| E-UTRAN CGI | M | 9.2.1.38 | | YES | ignore |
| Trace Collection Entity IP Address | M | Transport Layer Address 9.2.2.1 | Defined in [10] | YES | ignore |
| Start time | O | INTEGER | Starting time of the ongoing logged MDT trace recording session | | |
| Logging duration | O | INTEGER | Duration of the ongoing logged MDT trace recording session | | |
| UE selection eNB condition | O | (see 3.1.5.2) | It specifies the eNB specific UE selection conditions. | | |

The IEs of the Initial Context Setup Request message are shown in Table below. The MME sends this message to the eNB to request the setup of a UE context. The new information element "ongoing logged MDT trace" added to the message is shown in bold in Table 5.

TABLE 5

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | M | | | | YES | reject |
| >E-RAB to Be Setup Item IEs | | 1 to <max no of E-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |

TABLE 5-continued

| IE/Group Name | Presence | Range | IE type and reference | Semantics description | Criticality | Assigned Criticality |
|---|---|---|---|---|---|---|
| UE Security Capabilities | M | | 9.2.1.40 | | YES | reject |
| Security Key | M | | 9.2.1.41 | The KeNB is provided after the key-generation in the MME, see [15] | YES | reject |
| Trace Activation | O | | 9.2.1.4 | | YES | ignore |
| Ongoing logged MDT trace | O | | 3.1.5.1 | | | |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |

The IEs of the Trace Request message are shown in Table 6 below. The eNB sends this message to the MME to request the MME to initiate tracing for the particular UE context when MME specific selection conditions are satisfied. The same IEs may be added to the Handover Notify and Path Switch Request messages to enable sending the trace request piggy-backed on handover signaling, since handover is a typical situation in which a trace is newly initiated. The Trace Request message may include the optional IE "EPC trace configuration" to be used for specifying EPC (e.g., MME)-specific trace configurations and thereby enable the eNB to trigger a trace activation toward the EPC. The EPC-specific trace configuration may include similar parameters as those sent in trace activation IEs between core network nodes and which may include parameters such as triggering conditions, trace depth, and interfaces to trace. The "UE selection MME condition" IE and the "EPC trace configuration" IE may be grouped under one IE in a particular embodiment.

TABLE 6

| IE/Group Name | Presence | IE type and reference | Semantics description | Criticality | Assigned Criticality |
|---|---|---|---|---|---|
| Message Type | M | | | YES | ignore |
| MME UE S1AP ID | M | | | YES | reject |
| eNB UE S1AP ID | M | | | YES | reject |
| E-UTRAN Trace ID | M | | OCTET STRING (8) | The E-UTRAN Trace ID IE is composed of the following: Trace Reference defined in [10] (leftmost 6 octets), and Trace Recording Session Reference defined in [10] (last 2 octets) | ignore |

TABLE 6-continued

| IE/Group Name | Presence | IE type and reference | Semantics description | Criticality | Assigned Criticality |
|---|---|---|---|---|---|
| UE selection MME condition | M | | It specifies the MME specific UE selection conditions | | |
| EPC trace configuration | O | | It includes EPC specific trace parameters, such as triggers, interfaces to trace, trace-depth etc., | | |

The IEs of the "UE selection MME condition" message are shown in Table 7 below. This message defines parameters related to the MME-specific UE selection conditions in the trace request. In this embodiment, the MME-specific selection conditions include only IMEI, but may be extended with other information elements as well.

TABLE 7

| IE/Group Name | Presence | IE type and reference | Semantics description | Criticality | Assigned Criticality |
|---|---|---|---|---|---|
| IMEI List | | | | | |
| > IMEI | M | IMEI Type with range | It lists the IMEI values or IMEI ranges that the MME shall apply for UE selection. | | |

The IEs of the Trace Cancel Notify message are shown in Table 8 below. The eNB sends this message to the MME to inform the MME that the eNB-specific trace condition for the particular UE context has not been satisfied. The message may be sent for either MME-initiated or eNB-initiated trace. In response to receiving this message, the MME may deactivate the trace for the particular UE, provided that the trace was initiated originally by the MME.

TABLE 8

| IE/Group Name | Presence | IE type and reference | Semantics description | Criticality | Assigned Criticality |
|---|---|---|---|---|---|
| Message Type | M | | | YES | ignore |
| MME UE S1AP ID | M | | | YES | reject |
| eNB UE S1AP ID | M | | | YES | reject |

TABLE 8-continued

| IE/Group Name | Presence | IE type and reference | Semantics description | Criticality | Assigned Criticality |
|---|---|---|---|---|---|
| E-UTRAN Trace ID | M | OCTET STRING (8) | The E-UTRAN Trace ID IE is composed of the following: Trace Reference defined in [10] (leftmost 6 octets), and Trace Recording Session Reference defined in [10] (last 2 octets) | YES | ignore |

The IEs of the Trace Start Notify message are shown in Table 9 below. The eNB sends this message to the MME to inform the MME that the eNB-specific trace condition for the particular UE context has been satisfied.

The Trace Start Notify message may include the optional IE "EPC trace configuration" to be used for specifying EPC (e.g., MME)-specific trace configurations and thereby enable the eNB to trigger a trace activation toward the EPC. The EPC-specific trace configuration may include similar parameters as those sent in trace activation IEs between core network nodes and which may include parameters such as triggering conditions, trace depth, and interfaces to trace. The same IE may be added to the legacy Cell Traffic Trace signaling message as well.

TABLE 9

| IE/Group Name | Presence | IE type and reference | Semantics description | Criticality | Assigned Criticality |
|---|---|---|---|---|---|
| Message Type | M | | | YES | ignore |
| MME UE S1AP ID | M | | | YES | reject |

TABLE 9-continued

| IE/Group Name | Presence | IE type and reference | Semantics description | Criticality | Assigned Criticality |
|---|---|---|---|---|---|
| eNB UE S1APID | M | | | YES | reject |
| E-UTRAN Trace ID | M | OCTET STRING (8) | The E-UTRAN Trace ID IE is composed of the following: Trace Reference defined in [10] (leftmost 6 octets), and Trace Recording Session Reference defined in [10] (last 2 octets) | YES | ignore |
| EPC trace configuration | O | | It includes EPC specific trace parameters, such as triggers, interfaces to trace, trace-depth etc., | | |

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of managing User Equipment, UE-based network performance measurements utilizing a process of tracing a UE in a radio telecommunication network, the method comprising the steps of:
   receiving at an eNodeB, eNB, trace control and configuration parameters from a network management entity, wherein the parameters are configured by a network operator to include only eNB-specific selection conditions including identified cells and device capabilities of UEs, whereby the network operator targets UEs with the identified device capabilities and located in a geographical area corresponding to the identified cells for performance measurement collection;
   selecting by the eNB, UEs for tracing based on the eNB-specific selection conditions;
   initiating a trace by the eNB toward a given UE of one of the selected UEs; and
   notifying the one of the network management entity and the mobility management entity that the trace has been initiated for the given UE.

2. The method according to claim 1, wherein when the given UE changes cells, the eNB deactivates an immediate Minimization of Drive Test, MDT, trace recording session for the given UE by sending a Radio Resource Control, RRC, measurement reconfiguration message to the given UE.

3. The method according to claim 1, further comprising the steps of:
   receiving by the eNB, measurement reports from the given UE; and
   sending the measurement reports in a trace record from the eNB to a Trace Collection Entity, TCE.

4. The method according to claim 1, further comprising, for a logged trace session, the steps of:
   storing logged performance measurements by the given UE when a logging duration expires; and
   indicating by the given UE to the telecommunication network, that logged performance measurements are available when the given UE reenters a connected mode.

5. The method according to claim 1, further comprising the steps of:
   receiving by the eNB, a message from an Element Manager to deactivate a trace session for identified cells; and
   deactivating the trace session by the eNB for the identified cells in the message;
   wherein when the trace session is an immediate Minimization of Drive Test, MDT, trace session, the eNB deactivates corresponding MDT Radio Resource Control, RRC, measurements in UEs that have been configured for the immediate MDT trace session as part of the trace session.

6. The method according to claim 1, wherein the step of initiating a trace by the eNB toward the given UE of one of the selected UEs includes:
   initiating a trace recording session in the eNB for each selected UE that satisfies the eNB-specific selection conditions, provided that an Element Manager has previously activated a trace session in the eNB for identified cells; and
   configuring by the eNB, corresponding Radio Resource Control, RRC, measurements at the selected UEs.

* * * * *